(12) United States Patent
Oh et al.

(10) Patent No.: US 11,433,573 B2
(45) Date of Patent: Sep. 6, 2022

(54) METHOD FOR PRODUCING POLYAMIDE-IMIDE FILM

(71) Applicant: SKC CO., LTD., Gyeonggi-do (KR)

(72) Inventors: Dae Seong Oh, Seoul (KR); Dawoo Jeong, Gyeonggi-do (KR); Sunhwan Kim, Incheon (KR); Jin Woo Lee, Gyeonggi-do (KR); Dong Jin Lim, Gyeonggi-do (KR); Cheol Ho Kim, Seoul (KR)

(73) Assignee: SKC CO., LTD., Gyeonggi-do (KR)

( * ) Notice: Subject to any disclaimer, the term of this patent is extended or adjusted under 35 U.S.C. 154(b) by 488 days.

(21) Appl. No.: 16/480,853

(22) PCT Filed: Feb. 6, 2018

(86) PCT No.: PCT/KR2018/001533
§ 371 (c)(1),
(2) Date: Jul. 25, 2019

(87) PCT Pub. No.: WO2018/147611
PCT Pub. Date: Aug. 16, 2018

(65) Prior Publication Data
US 2019/0389095 A1     Dec. 26, 2019

(30) Foreign Application Priority Data

Feb. 8, 2017   (KR) .................. 10-2017-0017550
Feb. 28, 2017  (KR) .................. 10-2017-0026575

(51) Int. Cl.
| | | |
|---|---|---|
| B29C 39/00 | (2006.01) |
| B29C 48/00 | (2019.01) |
| B29C 39/44 | (2006.01) |
| C08G 73/10 | (2006.01) |
| C08G 73/14 | (2006.01) |
| C08L 79/08 | (2006.01) |
| B29K 79/00 | (2006.01) |

(52) U.S. Cl.
CPC ............ B29C 39/006 (2013.01); B29C 39/44 (2013.01); B29C 48/001 (2019.02); C08G 73/1003 (2013.01); C08G 73/14 (2013.01); C08L 79/08 (2013.01); B29K 2079/085 (2013.01); C08L 2203/16 (2013.01)

(58) Field of Classification Search
None
See application file for complete search history.

(56) References Cited

U.S. PATENT DOCUMENTS

2016/0222249 A1     8/2016  Choi et al.
2018/0002486 A1 *   1/2018  Kim ...................... C08G 81/00

FOREIGN PATENT DOCUMENTS

| KR | 10-1519937      | 5/2015 |
| KR | 10-2015-0076114 | 7/2015 |
| KR | 10-2016-0081829 | 7/2016 |
| KR | 10-2016-0081845 | 7/2016 |
| KR | 10-2017-0001644 | 1/2017 |

OTHER PUBLICATIONS

Office Action issued by the Chinese Patent Office dated May 8, 2021.

* cited by examiner

*Primary Examiner* — Timothy Kennedy
*Assistant Examiner* — Olukorede Esan
(74) *Attorney, Agent, or Firm* — IP & T Group LLP

(57) ABSTRACT

An embodiment can provide a method for producing a polyamide-imide film which is colorless and transparent and has excellent mechanical properties, the method comprising: a step of producing a polyamide-imide polymer solution by polymerizing an aromatic diamine compound, an aromatic dianhydride compound, and a dicarbonyl compound; a step of producing a gel sheet by extruding, casting and drying the polymer solution; and a step of producing a polyamide-imide film by heat-treating the gel sheet, wherein the viscosity of the polymer solution is 100,000 to 500,000 cps, and the polyamide-imide film has a yellowness index of 5 or lower, a haze of 2% or lower, a transmittance of 85% or above and a modulus of 5.0 GPa or above, at a thickness of 20 μm to 75 μm.

18 Claims, No Drawings

METHOD FOR PRODUCING POLYAMIDE-IMIDE FILM

This application is a national stage application of PCT/KR2018/001533 filed on Feb. 6, 2018, which claims priority of Korean patent application number 10-2017-0017550 filed on Feb. 8, 2017 and Korean patent application number 10-2017-0026575 filed on Feb. 28, 2017. The disclosure of each of the foregoing applications is incorporated herein by reference in its entirety.

TECHNICAL FIELD

Embodiments relate to a process for preparing a polyamide-imide film that is colorless, transparent, and excellent in mechanical properties.

BACKGROUND ART

Since polyamide-imide (PAI) is excellent in resistance to friction, heat, and chemicals, it is employed in such applications as primary electrical insulation, coatings, adhesives, resins for extrusion, heat-resistant paintings, heat-resistant boards, heat-resistant adhesives, heat-resistant fibers, and heat-resistant films.

Polyamide-imide is used in various fields. For example, polyamide-imide is made in the form of a powder and used as a coating for a metal or a magnetic wire. It is mixed with other additives depending on the application thereof. In addition, polyamide-imide is used together with a fluoropolymer as a painter for decoration and corrosion prevention. It also plays a role of bonding a fluoropolymer to a metal substrate. Further, polyamide-imide is used to coat kitchenware, used as a membrane for gas separation by virtue of its heat resistance and chemical resistance, and used in natural gas wells for filtration of such contaminants as carbon dioxide, hydrogen sulfide, and impurities.

In recent years, polyamide-imide has been developed in the form of a film, which is less expensive and has excellent optical, mechanical, and thermal characteristics.

DISCLOSURE OF INVENTION

Technical Problem

Embodiments aim to provide a process for preparing a polyamide-imide film that is colorless, transparent, and excellent in mechanical properties.

Solution to Problem

According to an embodiment to achieve the above object, there is provided a process for preparing a polyamide-imide film, which comprises polymerizing an aromatic diamine compound, an aromatic dianhydride compound, and a dicarbonyl compound to prepare a polyamide-imide polymer solution; extruding and casting the polymer solution and then drying the cast polymer solution to prepare a gel sheet; and thermally treating the gel sheet to produce the polyamide-imide film, wherein the viscosity of the polymer solution is 100,000 to 500,000 cps, and the polyamide-imide film has a yellow index of 5 or less, a haze of 2% or less, a transmittance of 85% or more, and a modulus of 5.0 GPa or more based on a thickness of 20 µm to 75 µm.

In addition, according to an embodiment, there is provided a process for preparing a polyamide-imide film, which comprises polymerizing an aromatic diamine compound, an aromatic dianhydride compound, and a dicarbonyl compound to prepare a polyamide-imide polymer solution; extruding and casting the polymer solution and then drying the cast polymer solution to prepare a gel sheet; and thermally treating the gel sheet to produce the polyamide-imide film, wherein the step of preparing the polymer solution comprises polymerizing the aromatic diamine compound, the aromatic dianhydride compound, a part of the dicarbonyl compound to produce a first polymer solution; and further adding the remaining part of the dicarbonyl compound to the first polymer solution to produce a second polymer solution that has a viscosity of 100,000 to 500,000 cps, the polymer solution comprises the polyamide-imide polymer and an organic solvent, the content of the polyamide-imide polymer is 5% by weight to 20% by weight based on the total weight of the polymer solution, and the polyamide-imide film has a yellow index of 5 or less, a haze of 2% or less, a transmittance of 85% or more, and a modulus of 5.0 GPa or more based on a thickness of 20 µm to 75 µm.

Advantageous Effects of Invention

The process for preparing a polyamide-imide film according to the embodiments is capable of providing a polyamide-imide film that is colorless, transparent, and excellent in mechanical properties.

BEST MODE FOR CARRYING OUT THE INVENTION

Hereinafter, the present invention will be described in detail with reference to the examples. The examples may be modified into various forms as long as the gist of the invention is not altered.

In this specification, when a part is referred to as "comprising" an element, it is to be understood that the part may comprise other elements as well, unless otherwise indicated.

Further, all numbers and expression related to the quantities of components, reaction conditions, and the like used herein are to be understood as being modified by the term "about," unless otherwise indicated.

The terms first, second, and the like are used herein to describe various elements, and the elements should not be limited by the terms. The terms are used only for the purpose of distinguishing one element from another.

Embodiments provide a process for preparing a polyamide-imide film that is colorless, transparent, and excellent in mechanical properties.

The process for preparing a polyamide-imide film according to an embodiment comprises polymerizing an aromatic diamine compound, an aromatic dianhydride compound, and a dicarbonyl compound to prepare a polyamide-imide polymer solution; extruding and casting the polymer solution and then drying the cast polymer solution to prepare a gel sheet; and thermally treating the gel sheet to produce the polyamide-imide film, wherein the viscosity of the polymer solution is 100,000 to 500,000 cps, and the polyamide-imide film has a yellow index of 5 or less, a haze of 2% or less, a transmittance of 85% or more, and a modulus of 5.0 GPa or more based on a thickness of 20 µm to 75 µm.

In addition, the process for preparing a polyamide-imide film according to an embodiment comprises polymerizing an aromatic diamine compound, an aromatic dianhydride compound, and a dicarbonyl compound to prepare a polyamide-imide polymer solution; extruding and casting the polymer solution and then drying the cast polymer solution to prepare a gel sheet; and thermally treating the gel sheet to produce the polyamide-imide film, wherein the step of preparing the polymer solution further comprises polymerizing the aromatic diamine compound, the aromatic dianhydride compound, a part of the dicarbonyl compound to produce a first polymer solution; and further adding the remaining part of the dicarbonyl compound to the first polymer solution to produce a second polymer solution that has a viscosity of 100,000 to 500,000 cps, the polymer solution comprises the polyamide-imide polymer and an organic solvent, the content of the polyamide-imide polymer is 5% by weight to 20% by weight based on the total weight of the polymer solution, and the polyamide-imide film has a yellow index of 5 or less, a haze of 2% or less, a transmittance of 85% or more, and a modulus of 5.0 GPa or more based on a thickness of 20 μm to 75 μm.

The polymer solution comprises the polyamide-imide polymer and an organic solvent. The content of the polyamide-imide polymer may be 5% by weight to 20% by weight, 8% by weight to 15% by weight, or 10% by weight to 15% by weight, based on the total weight of the polymer solution.

The organic solvent employed in the polymerization reaction may be at least one selected from the group consisting of dimethylformamide (DMF), dimethylacetamide (DMAc), N-methyl-2-pyrrolidone (NMP), m-cresol, tetrahydrofuran (THF), and chloroform, but it is not limited thereto.

Further, the step of preparing the polymer solution comprises polymerizing an aromatic diamine compound, an aromatic dianhydride compound, and a dicarbonyl compound.

Specifically, the dicarbonyl compound may comprise a first dicarbonyl compound and a second dicarbonyl compound. The step of preparing the polymer solution may comprise polymerizing the aromatic diamine compound, the aromatic dianhydride compound, the first dicarbonyl compound, and the second dicarbonyl compound in an organic solvent to produce a first polymer solution; and further adding the second dicarbonyl compound to the first polymer solution to produce a second polymer solution that has a viscosity of 100,000 to 500,000 cps.

In addition, the step of preparing the polymer solution may comprise polymerizing the aromatic diamine compound, the aromatic dianhydride compound, a part of the dicarbonyl compound to produce a first polymer solution; and further adding the remaining part of the dicarbonyl compound to the first polymer solution to produce a second polymer solution that has a viscosity of 100,000 to 500,000 cps.

Specifically, the dicarbonyl compound may comprise a first dicarbonyl compound and a second dicarbonyl compound. The part of the dicarbonyl compound in the step of producing the first polymer solution may comprise the first dicarbonyl compound, and the remaining part of the dicarbonyl compound in the step of producing the second polymer solution may comprise the second dicarbonyl compound. More specifically, the part of the dicarbonyl compound in the step of producing the first polymer solution may comprise the first dicarbonyl compound in its entirety and a part of the second dicarbonyl compound, and the remaining part of the dicarbonyl compound in the step of producing the second polymer solution may comprise the remaining part of the second dicarbonyl compound.

In addition, the step of producing the first polymer solution may comprise simultaneously or sequentially polymerizing the aromatic diamine compound, the aromatic dianhydride compound, the first dicarbonyl compound, and the second dicarbonyl compound.

Specifically, the step of producing the first polymer solution may comprise simultaneously polymerizing the aromatic diamine compound, the aromatic dianhydride compound, the first dicarbonyl compound, and the second dicarbonyl compound.

In addition, the step of producing the first polymer solution may comprise polymerizing the aromatic diamine compound and the aromatic dianhydride compound to produce a polyamic acid solution; and adding the first dicarbonyl compound and the second dicarbonyl compound to the polyamic acid solution to polymerize them.

The polyamic acid solution is a solution comprising a polyamic acid.

In a different way, the step of producing the first polymer solution may comprise polymerizing the aromatic diamine compound, the first dicarbonyl compound, and the second dicarbonyl compound to produce an amide polymer solution; and adding the aromatic dianhydride compound to the amide polymer solution to polymerize them.

The amide polymer solution is a solution comprising a polymer having amide repeat units.

The copolymer comprised in the first polymer solution comprises an imide repeat unit derived from the polymerization of the aromatic diamine compound and the aromatic dianhydride compound and amide repeat units derived from the polymerization of the aromatic diamine compound and the dicarbonyl compound.

The first polymer solution is a prepolymer solution for preparing the second polymer solution. That is, the first polymer solution is subjected to a further polymerization reaction to thereby produce the second polymer solution. The second polymer solution is a solution containing the polymer to be used for preparing the polyamide-imide film according to the embodiment.

The viscosity of the first polymer solution is 1,000 to 100,000 cps. Specifically, the viscosity of the first polymer solution may be 1,000 to 70,000 cps, 1,000 to 50,000 cps, 1,000 to 35,000 cps, or 2,000 to 35,000 cps, but it is not limited thereto.

The aromatic diamine compound is a compound that forms an imide bond with the aromatic dianhydride compound and forms amide bonds with the dicarbonyl compound, to thereby form a copolymer.

In an embodiment, one kind of aromatic diamine may be used as the aromatic diamine compound. If a single kind of aromatic diamine compound is used, the chemical structure of the polyamide-imide polymer can be easily designed, and the process efficiency can be enhanced.

For example, the aromatic diamine compound may comprise 2,2'-bis(trifluoromethyl)-4,4'-diaminobiphenyl (TFDB) represented by the following Formula 1, but it is not limited thereto.

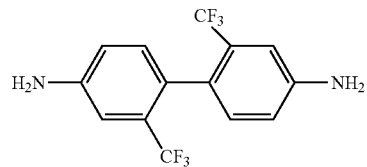

[Formula 1]

The aromatic dianhydride compound is a compound that can contribute to improvements in the optical properties such as transmittance of the polyamide-imide film, since it has a low birefringence value.

In an embodiment, one kind of aromatic dianhydride may be used as the aromatic diamine compound. If a single kind of aromatic diamine compound is used, the chemical structure of the polyamide-imide polymer can be easily designed, and the process efficiency can be enhanced.

For example, the aromatic dianhydride compound may comprise 2,2'-bis-(3,4-dicarboxyphenyl) hexafluoropropane dianhydride (6-FDA) represented by the following Formula 2, but it is not limited thereto.

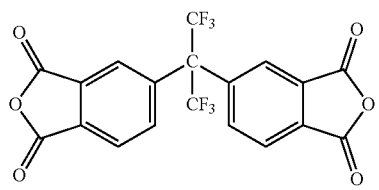

[Formula 2]

The aromatic diamine compound and the dianhydride compound may be polymerized to form a polyamic acid.

Subsequently, the polyamic acid may be converted to a polyimide through a dehydration reaction, and the polyimide comprises an imide repeat unit.

For example, the polyimide may comprise a compound represented by the following Formula 3, but it is not limited thereto.

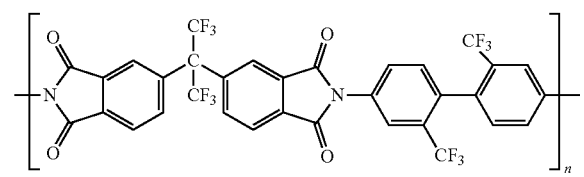

[Formula 3]

In the above Formula 3, n is an integer of 1 to 400.

The dicarbonyl compound may be a first dicarbonyl compound and/or a second dicarbonyl compound.

The first dicarbonyl compound and the second dicarbonyl compound may be an aromatic dicarbonyl compound, respectively.

The first dicarbonyl compound and the second dicarbonyl compound may be compounds different from each other.

For example, the first dicarbonyl compound and the second dicarbonyl compound may be aromatic dicarbonyl compounds different from each other, but they are not limited thereto.

If the first dicarbonyl compound and the second dicarbonyl compound are an aromatic dicarbonyl compound, respectively, they comprise a benzene ring. Thus, they can contribute to improvements in the mechanical properties such as surface hardness and tensile strength of the polyamide-imide film thus produced.

In an embodiment, two kinds of aromatic dicarbonyl compound may be used as the dicarbonyl compound. If two kinds of aromatic dicarbonyl compound are used, the chemical structure of the polyamide-imide polymer can be designed to materialize the desired properties, and the process efficiency can be enhanced.

The dicarbonyl compound may be selected from 1,1'-biphenyl-4,4'-dicarbonyl dichloride (BPDC) and terephthaloyl chloride (TPC). But it is not limited thereto.

For example, the first dicarbonyl compound may comprise 1,1'-biphenyl-4,4'-dicarbonyl dichloride (BPDC) represented by the following Formula 4, but it is not limited thereto.

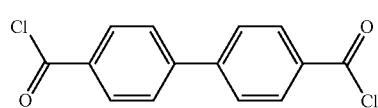

[Formula 4]

Further, the second dicarbonyl compound may comprise terephthaloyl chloride (TPC) represented by the following Formula 5, but it is not limited thereto.

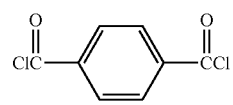

[Formula 5]

If 1,1'-biphenyl-4,4'-dicarbonyl dichloride (BPDC) is used as the first dicarbonyl compound and terephthaloyl chloride (TPC) is used as the second dicarbonyl compound in a proper combination, the polyamide-imide film thus produced may have high oxidation resistance.

In addition, the aromatic diamine compound and the aromatic dicarbonyl compound may be polymerized to form amide repeat units represented by the following Formulae 6 and 7.

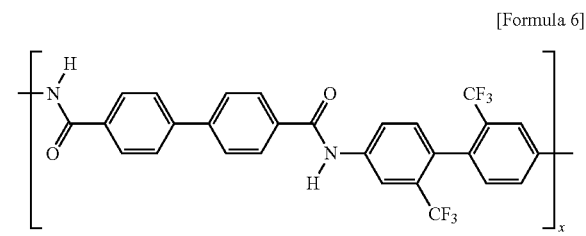

[Formula 6]

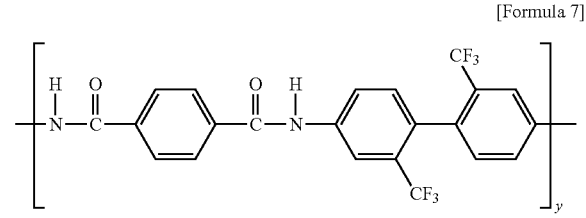

[Formula 7]

In the above Formula 6, x is an integer of 1 to 400.
In the above Formula 7, y is an integer of 1 to 400.

The aromatic diamine compound may comprise 2,2'-bis(trifluoromethyl)-4,4'-diaminobiphenyl (TFDB), the aromatic dianhydride compound may comprise 2,2'-bis(3,4-dicarboxyphenyl) hexafluoropropane dianhydride (6-FDA), the first dicarbonyl compound may comprise 1,1'-biphenyl-4,4'-dicarbonyl dichloride (BPDC), and the second dicarbonyl compound may comprise terephthaloyl chloride (TPC). But they are not limited thereto.

The aromatic diamine compound may be 2,2'-bis(trifluoromethyl)-4,4'-diaminobiphenyl (TFDB), the aromatic dianhydride compound may be 2,2'-bis(3,4-dicarboxyphenyl) hexafluoropropane dianhydride (6-FDA), the first dicarbonyl compound may be 1,1'-biphenyl-4,4'-dicarbonyl dichloride (BPDC), and the second dicarbonyl compound may be terephthaloyl chloride (TPC). But they are not limited thereto.

An embodiment is characterized in that it is capable of providing a polyamide-imide film whose optical characteristics, mechanical properties, and flexibility are improved in a well-balanced manner without a complicated process by properly controlling the content of the imide repeat unit and those of the amide repeat units.

The content of the imide repeat unit and those of the amide repeat units may be controlled by the amounts of the aromatic dianhydride compound and the dicarbonyl compound.

In another embodiment, the step of obtaining the first polymer solution may comprise adding the aromatic dianhydride compound, the first dicarbonyl compound, and the second dicarbonyl compound to an excessive amount of the aromatic diamine compound.

Specifically, the aromatic dianhydride compound may be employed in an amount of 20% by mole to 50% by mole based on the total moles of the aromatic dianhydride compound, the first dicarbonyl compound, and the second dicarbonyl compound, but it is not limited thereto.

If the content of the aromatic dianhydride compound is within the above range, the polyamide-imide film has excellent mechanical properties in terms of surface hardness, tensile strength, and the like.

In addition, the first dicarbonyl compound and the second dicarbonyl compound may be employed in an amount of 50% by mole to 80% by mole based on the total moles of the aromatic dianhydride compound, the first dicarbonyl compound, and the second dicarbonyl compound, but it is not limited thereto.

If the content of the dicarbonyl compounds is within the above range, the polyamide-imide film has excellent optical properties in terms of transmittance, haze, and the like.

In the step of obtaining the first polymer solution in another embodiment, the first dicarbonyl compound may be employed in an amount of 50% by mole to 70% by mole based on the total moles of the first dicarbonyl compound and the second dicarbonyl compound, but it is not limited thereto.

The first dicarbonyl compound may comprise 1,1'-biphenyl-4,4'-dicarbonyl dichloride (BPDC), and the second dicarbonyl compound may comprise terephthaloyl chloride (TPC).

If the content of the first dicarbonyl compound is less than 50% by mole, the tensile strength (or modulus) of the polyimide film may be deteriorated. If the content of the first dicarbonyl compound exceeds 70% by mole, such optical properties as haze and the like may be deteriorated.

Preferably, in the step of obtaining the first polymer solution, (i) an excessive amount of the aromatic diamine compound at least in the same molar amount as that of the other reactants, (ii) 20% by mole to 50% by mole of the aromatic dianhydride compound based on the total moles of the aromatic dianhydride compound, the first dicarbonyl compound, and the second dicarbonyl compound, and (iii) 50% by mole to 80% of the first dicarbonyl compound and the second dicarbonyl compound based on the total moles of the aromatic dianhydride compound, the first dicarbonyl compound, and the second dicarbonyl compound may be employed.

Specifically, 50% by mole to 70% of the first dicarbonyl compound (e.g., 1,1'-biphenyl-4,4'-dicarbonyl dichloride, BPDC) and 30% by mole to 50% of the second dicarbonyl compound (e.g., terephthaloyl chloride, TPC) based on the total moles of the first dicarbonyl compound and the second dicarbonyl compound may be employed.

It is possible to provide a polyamide-imide film whose optical characteristics, mechanical properties, and flexibility are improved in a well-balanced manner without such steps as precipitation, filtration, drying, and redissolution as adopted in the prior art by properly controlling the content of the imide repeat unit and those of the amide repeat units in the step of obtaining the first polymer solution.

After the step of obtaining the first polymer solution, the second polymer solution having a viscosity of 100,000 to 500,000 cps may be obtained by further adding the second dicarbonyl compound to the first polymer solution.

The weight ratio of the second dicarbonyl compound added in the step of obtaining the first polymer solution to the second dicarbonyl compound added in the step of obtaining the second polymer solution may be 90:10 to 99:1, but it is not limited thereto.

In addition, the second dicarbonyl compound added in the step of obtaining the second polymer solution may be in the form of a solution in which the second dicarbonyl compound is dissolved in an organic solvent at a concentration of 5 to 20% by weight, but it is not limited thereto.

This is advantageous in that the desired viscosity can be accurately achieved.

For example, the viscosity of the second polymer solution may be 100,000 to 500,000 cps, 100,000 to 400,000 cps, or 150,000 to 350,000 cps, but it is not limited thereto.

If the viscosity of the second polymer solution is within the above range, a polyamide-imide film can be effectively produced in the extrusion and casting steps. In addition, the polyamide-imide film thus produced may have mechanical properties in terms of an improved modulus and the like.

The viscosity of the second polymer solution may be in the range described above based on that the content of solids contained in the second polymer solution is 5% by weight to 20% by weight. Specifically, the viscosity of the second polymer solution may be in the range described above based on that the content of solids contained in the second polymer solution is 10% by weight to 20% by weight. Specifically, the viscosity of the second polymer solution may be in the range described above based on that the content of solids contained in the second polymer solution is 11% by weight to 19% by weight, but it is not limited thereto.

If the content of solids contained in the second polymer solution is within the above range, a polyamide-imide film can be effectively produced in the extrusion and casting steps. In addition, the polyamide-imide film thus produced may have mechanical properties in terms of an improved modulus and the like and optical properties in terms of a low yellow index and the like.

A catalyst may be further added in the step of obtaining the first polymer solution, in the step of obtaining the second polymer, or after the step of obtaining the second polymer.

Examples of the catalyst include, but are not limited to, beta picoline, acetic anhydride, and the like.

The further addition of the catalyst may expedite the reaction rate and produce the effect of improving the bonding force between the repeat unit structures or that within the repeat unit structure.

In addition, the viscosity of the polymer solution may be appropriately adjusted in the steps of adding the catalyst, drying and redissolving the polymer solution, or the step of adding the solvent for the extrusion step.

The polyamide-imide polymer should have an appropriate solubility in the above-mentioned organic solvents. For example, the polymer may have such a solubility level that when 0.1 g of a polyamide-imide film finally prepared from the polyamide-imide polymer according to the embodiment is immersed in 10 mL of DMAc, it is observed with the naked eyes that the film is completely dissolved within one hour.

The process for preparing a polyamide-imide film according to an embodiment comprises extruding and casting the polymer solution and then drying the cast polymer solution to prepare a gel sheet, and thermally treating the gel sheet to produce the polyamide-imide film.

After the step of preparing the polymer solution, the process may comprise extruding and casting the polymer solution and then drying the cast polymer solution to prepare a gel sheet.

In the above extrusion and casting steps, the above-mentioned organic solvent may be used.

The polymer solution is extruded and cast onto a casting body such as a casting roll, a casting belt, and the like. In such event, the polymer solution is cast at a rate of about 0.5 m/min to about 15 m/min and in a thickness of 300 to 600 μm onto the casting body. More specifically, the polymer solution is cast in a thickness of 400 to 500 μm. If the extrusion and casting rates are within the above ranges, the polyamide-imide film thus produced by the preparation process according to the embodiment can have improved optical characteristics and mechanical characteristics.

That is, if the polymer solution has a viscosity in the above-mentioned range, the extrusion and casting at the extrusion rate as described above may be advantageous to have improved optical characteristics and mechanical characteristics.

After the polymer solution is cast onto a casting body, the solvent contained in the polymer solution is removed by a drying step to thereby form a gel sheet on the casting body.

The drying step may be carried out at a temperature of about 60° C. to about 150° C. for a period of time ranging from about 5 minutes to about 60 minutes.

Thereafter, the gel sheet is thermally treated in an atmospheric environment to thereby produce the polyamide-imide film according to the embodiment.

The thermal treatment may be carried out in a temperature range of about 60° C. to about 500° C. for about 5 to about 30 minutes. In more detail, the thermal treatment may be carried out for about 5 to about 20 minutes in an inline thermal treatment apparatus having in an inlet temperature of about 80° C. to about 300° C. and a temperature elevation rate of 1° C./min to 25° C./min.

Since the polyimide polymer has high oxidation resistance, it is hardly affected by oxygen contained in the atmosphere during the thermal treatment step. Thus, the polyimide film according to the embodiment may have improved optical characteristics.

In addition, nitrogen gas purging is carried out when a polyimide film is formed in the conventional process in order to prevent yellowing of the film and to secure transparency of the film. According to the embodiment, however, a polyamide-imide film having excellent optical characteristics can be produced without such nitrogen gas purging.

The polyamide-imide film prepared according to the embodiment may have a modulus of 5 GPa or more, 5.1 GPa or more, or 5.2 GPa or more. In addition, the maximum modulus of the polyamide-imide film prepared according to the embodiment may be 10 GPa or more, but it is not limited thereto.

In addition, the polyamide-imide film prepared according to the embodiment may have a transmittance measured at 550 nm of 85% or more, 87% or more, 88% or more, or 89% or more, based on a thickness of 20 μm to 75 μm or based on a thickness of about 25 μm to about 60 μm in more detail.

The polyamide-imide film prepared according to the embodiment may have a haze of 2% or less, 1.5% or less, 1.2% or less, 1.0% or less, 0.8% or less, or 0.6% or less, based on a thickness of 20 μm to 75 μm or based on a thickness of about 25 μm to about 60 μm in more detail.

In addition, the polyamide-imide film prepared according to the embodiment may have a yellow index (YI) of 5 or less, 4 or less, 3 or less, 2.8 or less, or 2.6 or less, based on a thickness of 20 μm to 75 μm or based on a thickness of about 25 μm to about 60 μm in more detail.

The various characteristics of the polyamide-imide film described above may be combined.

Mode for the Invention

Hereinafter, the present invention will be described in detail by referring to Examples. But the following Examples are intended to further illustrate the present invention, and the scope of the present invention is not limited thereto.

Example 1

A 1-ton polymerization reactor equipped with a temperature-controllable double jacket was charged with 326.3 kg of dimethyl acetamide (DMAc) as an organic solvent at 20° C. under a nitrogen atmosphere. Then, 29.7 kg (0.2 mole) of 2,2'-bis(trifluoromethyl)-4,4'-diaminobiphenyl (TFDB) as an aromatic diamine was slowly added thereto for dissolution thereof.

Subsequently, while 12.4 kg (0.06 mole) of 2,2'-bis(3,4-dicarboxyphenyl) hexafluoropropane dianhydride (6-FDA) as an aromatic dianhydride was slowly added thereto, the mixture was stirred for 1 hour.

Then, 10.9 kg (0.084 mole) of 1,1'-biphenyl-4,4'-dicarbonyldichloride (BPDC) as a first dicarbonyl compound was added, followed by stirring for 1 hour. And 4.5 kg (0.048 mole) of terephthaloyl chloride (TPC), which amounts to 96% of the amount to be added, as a second dicarbonyl compound was added, followed by stirring for 1 hour, thereby preparing a first polymer solution.

The viscosity of the first polymer solution thus prepared was measured. If the measured viscosity did not reach the target viscosity, a TPC solution in a DMAc organic solvent at a concentration of 10% by weight was prepared, and 500 to 1,000 mL of the TPC solution was added to the first polymer solution, followed by stirring for 30 minutes. This procedure was repeated, thereby preparing a second polymer solution.

The second polymer solution was coated onto a steel belt at a rate of about 10 m/min and in a thickness of 430 μm and then dried with hot air at 120° C. for 10 minutes. The dried polyamide-imide polymer was peeled off from the steel belt, fixed to a pin frame, and thermally treated in a temperature range of 80° C. to 500° C. at a temperature elevation rate of 2° C./min to obtain a polyamide-imide film having a thickness of 50 μm.

According to Example 1 above, the yield reached about 100% immediately before the film formation step (i.e., immediately before coating). Here, the "yield" refers to the ratio of the number of moles of the materials remaining in the solution for coating to the number of moles of the charged materials.

According to the conventional preparation process, the yield immediately before the film formation step is about 60%, which attributes to the loss of the materials that inevitably takes place at the steps of polyimidization, precipitation, filtration, and drying.

Examples 2 to 4

A polyamide-imide film was each produced in the same manner as Example 1 above, except that the viscosity of the second polymer solution was as shown in Table 1 below.

Comparative Examples 1 and 2

A polyamide-imide film was each produced in the same manner as Example 1 above, except that the viscosity of the second polymer solution was as shown in Table 1 below.

Comparative Example 3

A 500-ml reactor equipped with a stirrer, a nitrogen injector, a dropping funnel, a temperature controller, and a condenser was charged with 280.215 g of N-methyl-2-pyrrolidone (NMP) while nitrogen was passed through the reactor, followed by addition of bistrifluoromethylbenzidine (0.096 mole) for dissolution thereof. 21.184 g (0.072 mole) of biphenyltetracarboxylic acid dianhydride (BPDA) was added thereto and reacted for 1 hour. Thereafter, 9.063 g (0.0204 mole) of 2-bis(3,4-dicarboxyphenyl) hexafluoropropane dianhydride (6-FDA) was added thereto and reacted for 2 hours, followed by addition of 12.443 g (0.024 mole) of 2,2-bis(4-(4-aminophenoxy)phenyl)hexafluoropropane (HFBAPP) thereto for dissolution thereof for 1 hour. Then, 5.603 g (0.0276 mole) of terephthaloyl chloride (TPC) was added thereto and reacted for 18 hours to thereby obtain a polymer solution having a solid content of 22% by weight and a viscosity of 250,000 cps.

Upon completion of the reaction, the polymer solution was coated onto a stainless steel plate and cast in a thickness of 60 μm, which was then dried with hot air at 80° C. for 30 minutes, at 150° C. for 30 minutes, and at 280° C. for 30 minutes. Then, the dried polymer was gradually cooled and peeled off from the plate to thereby obtain a polyamide-imide film having a thickness of 50 μm.

Evaluation Example

The films according to Examples 1 to 4 and Comparative Examples 1 to 3 were measured and evaluated for the following properties. The results are shown in Table 1 below.

Evaluation Example 1: Measurement of Film Thickness 5 points were measured in the width direction with a Digital Micrometer 547-401 manufactured by Mitsutoyo Corporation, Japan, and an average value thereof was taken as a thickness.

Evaluation Example 2: Measurement of Transmittance (TT) and Haze (HZ)

The transmittance at 550 nm and the haze were measured using a haze meter NDH-5000W manufactured by Nippon Denshoku Kogyo.

Evaluation Example 3: Measurement of Yellow Index (YI)

The yellow Index (YI) was measured with a spectrophotometer (UltraScan PRO, Hunter Associates Laboratory) using a CIE colorimetric system.

Evaluation Example 4: Measurement of Modulus

A sample was cut out by at least 5 cm in the direction perpendicular to the main shrinkage direction of the film and by 10 cm in the main shrinkage direction. It was fixed by the clips disposed at intervals of 5 cm in a universal testing machine UTM 5566A of Instron. A stress-strain curve was obtained until the sample was fractured while it was stretched at a rate of 5 mm/min at room temperature. The slope of the load with respect to the initial strain in the stress-strain curve was taken as a modulus (GPa).

Evaluation Example 5: Appearance

The sample was observed at a 45° oblique angle under a 3-wavelength fluorescent lamp. It was evaluated as "gelation" when a nucleated or non-nucleated circular foreign object was found in the sample. It was evaluated as "○" when such foreign object was not present.

TABLE 1

| | Viscosity of the polymer solution (cps) | | | | | | | | |
|---|---|---|---|---|---|---|---|---|---|
| | 1st polymer solution | 2nd polymer solution | Thickness (μm) | TT (%) | HZ (%) | YI | Modulus (GPa) | Appearance | Solid content (wt. %) |
| Ex. 1 | 3,000 | 140,000 | 50 | 89.8 | 0.53 | 2.56 | 5.33 | O | 12.3 |
| Ex. 2 | 10,000 | 180,000 | 50 | 90.2 | 0.60 | 2.22 | 5.23 | O | 12.2 |
| Ex. 3 | 20,000 | 210,000 | 50 | 89.4 | 0.44 | 2.17 | 5.41 | O | 11.1 |
| Ex. 4 | 32,000 | 350,000 | 50 | 89.8 | 0.51 | 2.39 | 5.40 | O | 11.9 |
| C. Ex. 1 | 1,000 | 50,000 | 50 | 89.5 | 0.57 | 2.31 | 4.65 | O | 11.1 |
| C. Ex. 2 | 73,000 | 700,000 | 50 | 90.2 | 0.60 | 2.34 | 4.88 | gelation | 12.2 |
| C. Ex. 3 | 250,000 | | 50 | 78.2 | 2.30 | 6.8 | — | — | 22 |

As can be seen from Table 1 above, the films of Examples 1 to 4 were colorless and transparent and had excellent mechanical properties as compared with those of Comparative Examples 1 to 3. Further, since the films of the Examples are excellent in flexibility, they can be advantageously used in the flexible display field.

The invention claimed is:

1. A process for preparing a polyamide-imide film, which comprises:
   polymerizing an aromatic diamine compound, an aromatic dianhydride compound, and a part of a dicarbonyl compound to produce a first polymer solution that has viscosity of 1,000 to 100,000 cps;
   further adding the remaining part of the dicarbonyl compound to the first polymer solution to produce a polyamide-imide polymer solution that has viscosity of 100,000 to 500,000 cps;
   extruding and casting the polymer solution and then drying the cast polymer solution to prepare a gel sheet; and
   thermally treating the gel sheet to produce the polyamide-imide film,
   wherein the polyamide-imide film has a yellow index of 5 or less, a haze of 2% or less, a transmittance of 85% or more, and a modulus of 5.0 GPa or more based on a thickness of 20 μm to 75 μm.

2. The process for preparing a polyamide-imide film of claim 1, wherein in the step of preparing the polymer solution, the polymer solution comprises the polyamide-imide polymer and an organic solvent, and the content of the polyamide-imide polymer is 5% by weight to 20% by weight based on the total weight of the polymer solution.

3. The process for preparing a polyamide-imide film of claim 1, wherein the polymer solution is cast at a rate of about 0.5 m/min to about 15 m/min and in a thickness of 300 to 600 μm onto a casting body.

4. The process for preparing a polyamide-imide film of claim 1, wherein the polyamide-imide polymer solution comprises the aromatic dianhydride compound in an amount of 20% by mole to 50% by mole and the dicarbonyl compound in an amount of 50% by mole to 80% by mole based on the total moles of the aromatic dianhydride compound and the dicarbonyl compound.

5. The process for preparing a polyamide-imide film of claim 1, wherein one kind of aromatic diamine is used as the aromatic diamine compound, and one kind of aromatic dianhydride is used as the aromatic diamine compound.

6. The process for preparing a polyamide-imide film of claim 1, wherein the aromatic diamine compound comprises 2,2'-bis(trifluoromethyl)-4,4'-diaminobiphenyl (TFDB), and the aromatic dianhydride compound comprises 2,2'-bis(3,4-dicarboxyphenyl) hexafluoropropane dianhydride (6-FDA).

7. The process for preparing a polyamide-imide film of claim 1, wherein the dicarbonyl compound is at least one selected from the group consisting of 1,1'-biphenyl-4,4'-dicarbonyl dichloride (BPDC) and terephthaloyl chloride (TPC).

8. The process for preparing a polyamide-imide film of claim 1, wherein the dicarbonyl compound comprises a first dicarbonyl compound and a second dicarbonyl compound, and
   the step of preparing the polymer solution comprises polymerizing the aromatic diamine compound, the aromatic dianhydride compound, the first dicarbonyl compound, and the second dicarbonyl compound in an organic solvent to produce a first polymer solution; and
   further adding the second dicarbonyl compound to the first polymer solution to produce a second polymer solution that has a viscosity of 100,000 to 500,000 cps.

9. The process for preparing a polyamide-imide film of claim 8, wherein the step of producing the first polymer solution comprises simultaneously or sequentially polymerizing the aromatic diamine compound, the aromatic dianhydride compound, the first dicarbonyl compound, and the second dicarbonyl compound.

10. The process for preparing a polyamide-imide film of claim 9, wherein the step of producing the first polymer solution comprises polymerizing the aromatic diamine compound and the aromatic dianhydride compound to produce a polyamic acid solution; and adding the first dicarbonyl compound and the second dicarbonyl compound to the polyamic acid solution to polymerize them.

11. The process for preparing a polyamide-imide film of claim 2, wherein the organic solvent is at least one selected from the group consisting of dimethylformamide (DMF), dimethylacetamide (DMAc), N-methyl-2-pyrrolidone (NMP), m-cresol, tetrahydrofuran (THF), and chloroform.

12. The process for preparing a polyamide-imide film of claim 8, wherein the first dicarbonyl compound and the second dicarbonyl compound are aromatic dicarbonyl compounds different from each other.

13. The process for preparing a polyamide-imide film of claim 8, wherein the weight ratio of the second dicarbonyl compound added in the step of obtaining the first polymer solution to the second dicarbonyl compound added in the step of obtaining the second polymer solution is 90:10 to 99:1.

14. The process for preparing a polyamide-imide film of claim 8, wherein the second dicarbonyl compound added in the step of obtaining the second polymer solution is in the form of a solution in which the second dicarbonyl compound is dissolved in an organic solvent at a concentration of 5 to 20% by weight.

15. The process for preparing a polyamide-imide film of claim 1, wherein the viscosity of the polymer solution is 150,000 to 350,000 cps.

16. A process for preparing a polyamide-imide film, which comprises:
   polymerizing an aromatic diamine compound, an aromatic dianhydride compound, and a dicarbonyl compound to prepare a polyamide-imide polymer solution;
   extruding and casting the polymer solution and then drying the cast polymer solution to prepare a gel sheet; and
   thermally treating the gel sheet to produce the polyamide-imide film,
   wherein the step of preparing the polymer solution comprises:
   polymerizing the aromatic diamine compound, the aromatic dianhydride compound, a part of the dicarbonyl compound to produce a first polymer solution that has a viscosity of 1,000 to 100,000 cps; and
   further adding the remaining part of the dicarbonyl compound to the first polymer solution to produce a second polymer solution that has a viscosity of 150,000 to 350,000 cps;
   the polymer solution comprises the polyamide-imide polymer and an organic solvent, the content of the polyamide-imide polymer is 5% by weight to 20% by weight based on the total weight of the polymer solution, and
   the polyamide-imide film has a yellow index of 5 or less, a haze of 2% or less, a transmittance of 85% or more, and a modulus of 5.0 GPa or more based on a thickness of 20 μm to 75 μm.

17. The process for preparing a polyamide-imide film of claim 16, wherein the dicarbonyl compound comprises a first dicarbonyl compound and a second dicarbonyl compound, and the part of the dicarbonyl compound in the step of producing the first polymer solution comprises the first dicarbonyl compound, and the remaining part of the dicarbonyl compound in the step of producing the second polymer solution comprises the second dicarbonyl compound.

18. The process for preparing a polyamide-imide film of claim 17, wherein the second dicarbonyl compound comprises terephthaloyl chloride.

* * * * *